June 12, 1956     H. T. M. RICE ET AL     2,750,020
ADJUSTABLE RELEASABLE TORQUE TRANSMITTING APPARATUS
Filed Jan. 8, 1952     2 Sheets-Sheet 1

HENRY T. M. RICE,
ROBERT T. STEVENS,
INVENTORS.

BY
Bernard Siegel
ATTORNEY.

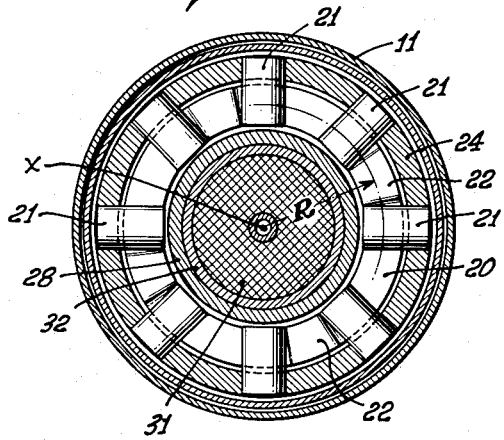
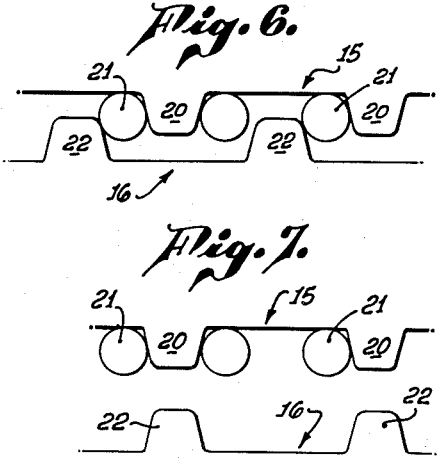
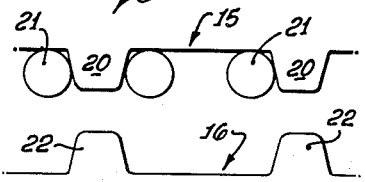
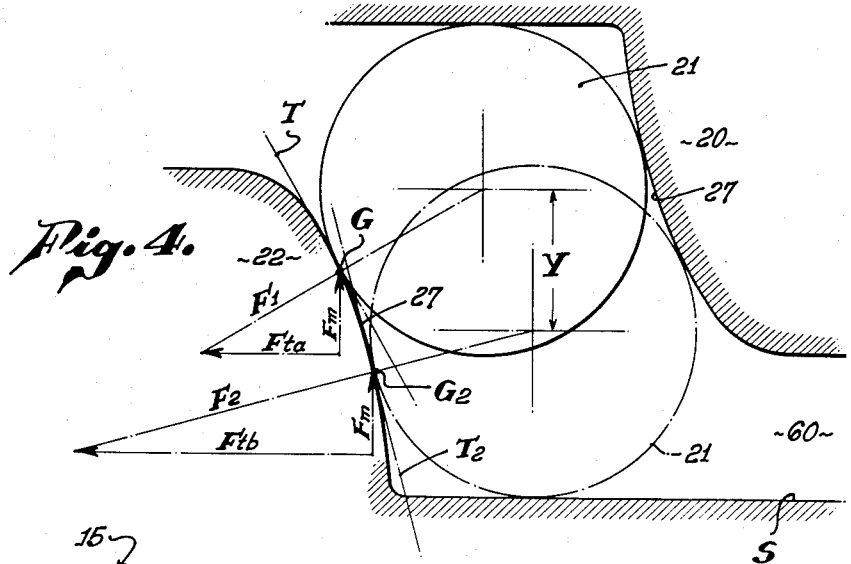
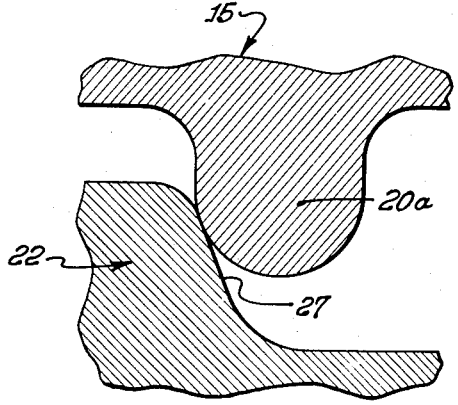
Henry T. M. Rice,
Robert T. Stevens,
INVENTORS.

Patented June 12, 1956

2,750,020

ADJUSTABLE RELEASABLE TORQUE TRANSMITTING APPARATUS

Henry T. M. Rice, San Marino, and Robert T. Stevens, Altadena, Calif., assignors to Dillon Stevens, Los Angeles, Calif.

Application January 8, 1952, Serial No. 265,513

22 Claims. (Cl. 192—56)

The present invention relates to torque transmitting devices, and more particularly to devices in which the drive is disrupted automatically when the torque transmitted exceeds a predetermined value.

An object of the present invention is to provide improved apparatus that releases automatically when the torque transmitted through it reaches a predetermined and preselected value.

Another object of the invention is to provide an improved releasable torque transmitting apparatus which can be adjusted readily to vary the torque at which disruption of the drive will occur automatically.

A further object of the invention is to provide releasable torque transmitting apparatus embodying clutch elements that are held in engagement by application of a predetermined holding force, and in which the torque at which the clutch elements are automatically released can be varied without changing the predetermined holding force. In a more limited sense, the holding force can be constant and the variable torque release obtained by suitably shaping the working or coengaging faces of the clutch elements, and altering the initial point of contact of the coengaging clutch elements with each other.

Yet another object of the invention is to provide releasable torque transmitting apparatus that is held in engagement by a magnetic holding force, and in which the torque at which the clutch elements are releasable can be varied without altering the magnetic holding force.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Fig. 3 is a cross-section on a reduced scale taken along the line 3—3 on Fig, 1;

Fig. 4 is a diagrammatic view illustrating the variations in the torque that can be transmitted by the apparatus;

Fig. 5 is a fragmentary section through a modified form of engaging clutch teeth that can be incorporated in the device shown in Fig. 1;

Fig. 6 is a diagrammatic side elevation of a portion of the clutch mechanism, with the clutch parts in engaged position;

Fig. 7 is a view similar to Fig. 6 disclosing the clutch parts in disengaged position.

Figure 1:
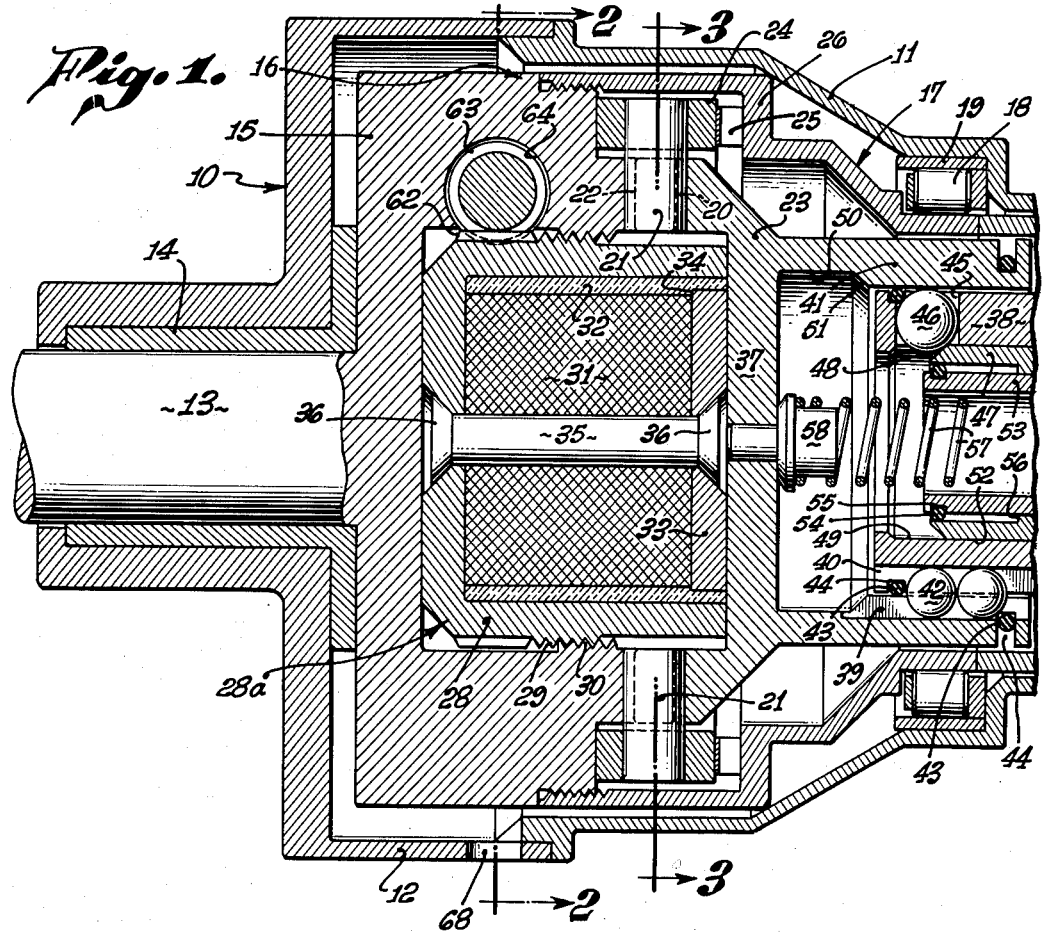
Figure 1 is a longitudinal section through a device embodying the invention.
Figure 2:
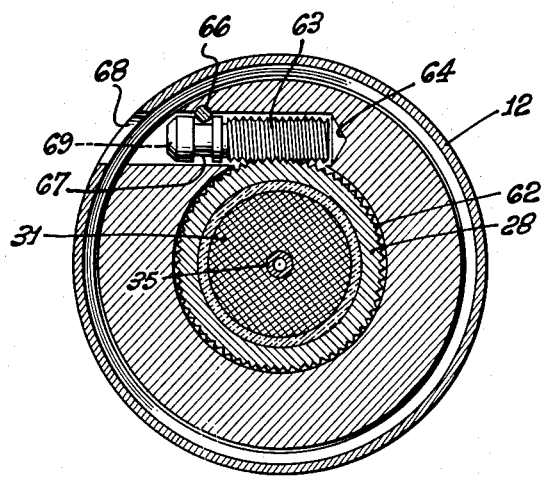
Fig. 2 is a cross-section on a reduced scale taken along the line 2—2 on Fig. 1.

The apparatus illustrated in the drawings is designed to transmit rotary motion, and to automatically discontinue the transmission of such motion to the driven member when the torque reaches a predetermined and preselected value, which can be varied as desired. The apparatus includes an outer stationary housing or casing 10 including a forward portion 11 piloted within a rearward portion 12. A driving member or shaft 13 extends through a suitable bearing sleeve 14 from the rearward portion, being integrally secured, or otherwise suitably attached, to the rearward portion 15 of a rotatable housing 16 to which a forward portion 17 is threadedly secured. This forward portion 17 is suitably supported for rotation in the stationary casing 10 by a roller type of radial bearing, including circumferentially arranged rollers 18 engaging the periphery of the forward housing portion 17, and also the inner surface of an outer race 19 mounted in the casing.

The rearward rotatable housing portion 15 may be constituted as a driving clutch member having axially extending teeth 20 engageable with a series of circumferentially spaced radially arranged rollers 21, which, in turn, are engageable with clutch teeth 22 extending axially from a driven clutch member 23. The rollers 21 are rotatably carried in a ring or cage 24, urged in a rearward direction by a spring member 25, which may take the form of an annular spring-like washer of wave form engaging the ring 24 and also a shoulder 26 in the forward portion 17 of the rotatable housing 16. The spring 25 may be flattened when the clutch is released, allowing limited forward movement of the rollers 21 and their carrying ring 24. However, upon release of the load, the spring 25 can return the cage 24 and rollers 21 to their initial rearward position.

It is to be noted that the teeth 20, 22 on the driving and driven clutch members 15, 23 have tapered or cam surfaces 27 engaging the rollers. Because of such sloping tooth working faces 27, the torque being transmitted has a force component in an axial direction tending to shift the driven clutch member 23 forwardly, until its clutch teeth 22 are out of engagement with the intermediate rollers 21. Such tendency of the torque being transmitted to shift the driven member 23 in a forward and releasing direction is resisted by a holding device which will only release when a predetermined torque is transmitted.

As disclosed in the drawings, the holding device 28a is a magnetic one and includes a cup-shaped magnet holder 28 disposed primarily within the driving clutch member 15 and having external threads 29 meshing with internal threads 30 in the driving clutch member. A permanent magnet 31 is disposed in the cup-shaped holder, being surrounded by a brass, or other non-magnetic, bushing or sleeve 32 between the magnet and the holder. A soft iron plate or pole piece 33 is disposed across and in contact with the forward face of the magnet 31 and engages a shoulder 34 on the bushing 32 to hold the latter in a rearward direction against the base of the cup-shaped holder 28. A centrally disposed rivet 35 extends through the base of the cup-shaped holder 28, the magnet 31 and the pole piece 33, being provided with suitable heads 36 on its opposite ends bearing against the holder base and plate 33 to secure all components of the magnet structure together.

The magnet structure 28a is engaged by a transverse wall or armature portion 37 of the driven clutch member 23. The force of attraction between the magnet structure and the armature tends to hold the driven clutch member 23 in a rearward position, in which its clutch teeth 22 are engaged by the rollers 21; so that the torque is being transmitted from the driving clutch teeth 20 through the rollers 21 to the driven clutch teeth 22. When the torque transmitted overcomes the holding force of the magnet 31, the driven member 23 is shifted in a forward direction until complete disengagement occurs between the driven teeth 22 and the rollers 21. When this occurs, the driven clutch member 23 is latched in its released position, out of engagement with the rollers 21, by a latching device, described below.

The rotation of the driven clutch member 23 is transmitted to another rotatable member 38 through a slidable spline connection. This connection includes opposed grooves 39, 40 in a sleeve extension 41 of the driven clutch member and in the rotatable member 38, in which balls 42, or other rollable elements, are received. These balls are prevented from dropping out of the grooves 39, 40 by split snap rings 43 disposed in peripheral grooves 44 in the rotatable member 38 and driven clutch member extension 41. It is apparent that the balls 42 will serve to transmit the rotation of the driven clutch member 23 to the other roatable member 38, while permitting the driven clutch member 23 to move axially in both directions relative to the rotatable member 38.

When the driven clutch member 23 moves in the forward direction along the other rotatable member 38 to the extent at which the driven clutch teeth 22 are out of engagement with the rollers 21, it is releasably latched or secured in the disengaged position. Thus, the rotatable member 38 has one or a plurality of radial holes 45 in which latch ball elements 46 are received. These elements are engaged by a latch sleeve 47 having a tapered cam end 48 that normally urges the latch balls 46 in an outward direction under the influence of a spring (not shown) acting upon the latch sleeve 47 and tending to shift it rearwardly. The sleeve 47 is prevented from shifting initially, since the balls 46 engage the inner cylindrical surface 49 of the driven clutch member 23. However, when the driven member 23 is shifted forwardly to its clutch released position, the balls 46 are free to enter an enlarged bore 50 in the driven member and be disposed upon an inclined latch shoulder 51. That is, the cam end 48 of the latch sleeve 47 is effective to shift the balls 46 laterally outward into engagement with the latch shoulder 51, the cylindrical periphery 52 of the latch sleeve 47 then sliding along the balls 46, holding them in their outward position.

The driven clutch member 23 cannot be shifted rearwardly to clutching engagement with the rollers 21 once again, until the ball latches 46 are released. This action will take place upon retracting the latch sleeve 47, which retraction occurs upon shifting an inner sleeve or spindle 53 in a forward direction, a ring 54 carried in a groove 55 in the spindle 53 engaging an internal shoulder or flange 56 on the latch sleeve 47, and pulling it in a forward direction into a position in which the cylindrical periphery 52 of the sleeve is no longer disposed behind the latch balls 46. When this occurs, a reengaging spring 57, which is in contact with a spring seat 58 carried by the driven member 23, urges the latter in a rearward direction, the tapered shoulder 51 shifting the latch balls 46 radially inward and the cylindrical surface 49 of the driven member then sliding freely past the latch balls until the driven member armature 37 again engages the magnet pole piece 33, at which time the coengaging clutch elements 20, 21, 22 are again in their initial driving position.

The foregoing construction and operation of the latch mechanism is both described and claimed in the above-identified patent application, and also in our application for "Releasable Torque Transmitting Apparatus," Serial No. 265,511, filed January 8, 1952.

The working faces 27 of the clutch teeth 20, 22, and particularly the driven clutch teeth 22, are curved; so that the slope of a tangent T at the point of contact G between each roller 21 and the working face 27 changes as the roller 21 is moved relatively along the working face. Because of the change of the slope of the tangent T at the point of contact G, it is possible to have a constant holding force to maintain the clutch members 20, 21, 22 coengaged, and yet require a different torque for effecting release of the clutch elements from one another.

By referring to Fig. 4, it will be found that the roller 21 is engaging the curved working face 27 of a driven cam clutch tooth 22 at the point G. A tangent T to the curve of the working face at the point of contact G has a certain slope and makes a definite angle to any reference line, such as the base S of the tooth space 60 between adjacent teeth 22 on the driven member, which base lies in a plane at right angles to the axis of rotation X of the driven member. The holding force $F_m$ exerted by the permanent magnet 31 on the driven member 23 is acting in a direction parallel to the axis X of the driven member, and may be represented by the vector $F_m$ indicated on Fig. 4. The force being transmitted between the roller 21 and the driven clutch tooth 22 is acting in a direction normal to the tangent line T and may be represented by the vector $F_1$. The force of rotation that must be transmitted to balance and overcome the holding force $F_m$ is represented by the vector $F_{ta}$, and this force is acting at the mean radius R of the clutch tooth 22 from the axis of rotation X of the driven clutch member. Thus, as represented in Fig. 4, the force $F_m$ of the magnet will be counterbalanced when a torque equal to $F_{ta}R$ is transmitted.

If the initial point of contact $G_2$ between the roller 21 and the working face 27 of the driven clutch tooth is now shifted downwardly, as seen in Fig. 4, the torque transmitted to overcome the holding force $F_m$ of the magnet must increase, inasmuch as the slope of the tangent $T_2$ at the point of contact between the roller and the working face of the tooth increases. The broken line in Fig. 4 represents the roller 21 occupying a lower initial position. A tangent $T_2$ drawn to the point of contact $G_2$ between the roller 21 and the face 27 of the driven cam tooth makes a steeper angle to the base line S between adjacent clutch teeth. The resultant force $F_2$ being transmitted can be represented by the vector $F_2$. Assuming that the armature portion 37 of the driven member 23 still engages the magnet, then the holding force exerted by the magnet is the same as in the other position, being designated on Fig. 4 as $F_m$, and being exactly of the same magnitude as the force of the other position of the roller 21 contacting the tooth face 27 at the point G. The force being transmitted at right angles to the axis of the driven member is then represented by the vector $F_{tb}$, and this latter force is acting at the mean radius R from the axis of rotation of the driven member. It is quite apparent from the vector diagrams shown in Fig. 4 that the torque $F_{tb}R$ transmitted in the second described initial position must be much greater than the corresponding torque $F_{ta}R$ in the first described position to overcome the holding force $F_m$ of the magnet on the driven member, before clutch release and disengagement is obtained.

Of course, other positions of initial contact between the roller 21 and working face 27 of the driven clutch teeth can be selected, the torque required to effect release of the clutch decreasing as the initial position of contact between the roller and the face of the clutch teeth moves up the face, inasmuch as the slope of the tangent T at the point of contact G decreases as the initial point of contact moves up the working face 27 of the driven cam tooth 22.

The initial point of contact G can be varied by shifting the driven clutch member 23 to and from the driving clutch member 15 while maintaining engagement between the armature 37 and the magnet 28—36. To accomplish this objective, the magnet holder 28 can be rotated within the driving clutch member 15 to thread the magnet holder 28, and the parts 31—36 contained therein, in a forward or rearward direction within the driving clutch member 15. Inasmuch as the driven member armature 37 engages the magnet, such longitudinal threading of the magnet in a forward or rearward direction correspondingly effects a shifting of the driven clutch member 23 in a forward or rearward direction, to determine the initial point of contact G between the working faces 27 of the driven clutch teeth 22 and the rollers 21.

Rotation of the magnet structure 28a within the driving clutch member 15 is effected, as illustrated in the drawings, by providing worm wheel teeth 62 on the periphery of the cup-shaped holder 28 which are engaged by a worm 63 rotatably mounted in a transverse bore 64 in the driving clutch member 15. The worm 63 is prevented from moving axially by a suitable pin 66 secured in the driving clutch member 15 and extending into a peripheral groove 67 in the worm. The worm 63 can be rotated whenever it is in alignment with an access hole 68 in the stationary casing 10, through which a suitable wrench or other tool (not shown) can be inserted and disposed within a wrench socket 69 in the worm. Rotation of the tool in the desired direction will rotate the worm 63 and correspondingly rotate the holder 28 and other magnet parts within the driving clutch member 15, feeding the magnet and the driven clutch member 23 in a forward or rearward direction, to determine the initial point of contact G between each roller 21 and its companion driven clutch tooth 22.

Although the working face 27 of each driven clutch tooth may assume various forms, so long as the slope of the tangent T at the point of contact G with the roller 21 can be changed, in order to vary the torque at which clutch release will occur, it is preferred to shape the working face of the clutch tooth in such manner that some proportion exists between the number of turns of the adjusting screw or worm 63 and the torque at which clutch release will occur. To obtain this condition, the tooth contour 27 must lie upon a surface swept out by the cylindrical roller 21, whose axis remains perpendicular to the axis X of the driven clutch member 23, and whose intercept in that axis is at an elevation above the starting point of the roller when it occupies one limiting position, which can be its position when engaging the base S of the driven member between adjoining clutch teeth. The equation for the tooth contour or curve 27 can be represented as follows:

$$Y = \frac{B}{A}(e^{AR\theta} - 1)$$

in which:

$Y$ = the relative axial distance that the roller and driven member move with respect to each other;

$B$ = a constant, which is the slope of the tangent T at the starting point of contact between the roller 21 and tooth face when $Y = 0$;

$A$ = a constant, which determines how fast the slope of the tangent T changes as $Y$ increases;

$\theta$ = the relative angle of rotation expressed in radians, of the driven member 23 about its axis X and with respect to the roller 21; and $R$ = the mean radius of the driven clutch tooth 22 from the axis X of the driven member 23.

From the above equation, it is evident that a curve is obtained which provides a definite proportion between the relative distance Y that the driven member 23 is coaxially shifted and the slope of the tangent T at the point of contact G between the roller 21 and tooth 22, the distance Y, in turn, obviously being a function of the number of turns of the adjusting screw 63. Since the output torque at which clutch release is obtained is proportional to the tooth shape 27, the mean radius R of the tooth, and the axial or magnetic force $F_m$ holding the rollers and cam teeth together, the output torque at which clutch release occurs is a function of the number of turns of the adjusting screw or worm 63.

It is, accordingly, evident that the torque at which release will occur can be very readily predetermined and preselected by suitable rotation of the worm 63, in order to change the initial point of contact G between each roller 21 and its companion cam tooth face 27. An infinite adjustment can take place within the limits of the apparatus, in order to vary the torque at which clutch release will occur.

A different form of clutch teeth is illustrated in Fig. 5. The driving member 15 has its tooth 20a directly engaging the inclined working face 27 of the driven member clutch tooth 22, rather than transmitting motion to the driven member through an intervening roller. The engaging faces of the driving teeth 20a may be of generally cylindrical form, and may be caused to engage the working face 27 of a driven tooth at different initial points, depending upon the adjustment of the magnet 28a and driven member 23 relative to the driving member 15. Such adjustment will determine the torque at which the clutch release will take place.

The inventors claim:

1. In releasable torque transmitting apparatus: driving and driven members; coengaging elements on said members for transmitting torque therebetween; a first element on one member engaging a working face on a second element of said other member; means exerting a force tending to hold said elements in engagement with each other, said elements being responsive to the torque transmitted between said first element and working face to effect disengagement between said elements against the force of said holding means; said working face having a shape in which the slope of the tangent at the point of contact of said face with said first element changes as said first element is shifted relatively along said working face; and means for adjusting said first and second elements with respect to each other to vary the initial point of contact between said first element and said working face through which the drive between said elements is normally transmitted in order to vary the predetermined torque that must be transmitted between said elements to effect automatic disengagement therebetween against the force of said holding means.

2. In releasable torque transmitting apparatus: driving and driven members; coengaging elements on said members for transmitting torque therebetween; a first element on one member engaging a working face on a second element of said other member; magnetic means exerting a constant force tending to hold said elements in engagement with each other, said elements being responsive to the torque transmitted between said first element and working face to effect disengagement between said elements against the force of said magnetic means; said working face having a shape in which the slope of the tangent at the point of contact of said face with said first element changes as said first element is shifted relatively along said working face; and means for adjusting said first and second elements with respect to each other to vary the initial point of contact between said first element and said working face through which the drive between said elements is normally transmitted in order to vary the predetermined torque that must be transmitted between said elements to effect automatic disengagement therebetween against the force of said magnetic means.

3. In releasable torque transmitting apparatus: driving and driven members; coengaging axially extending clutch elements on said members for transmitting torque therebetween, a first clutch element on one member engaging an axially extending working cam face of a second clutch element on the other member; means exerting an axial force tending to hold said clutch elements in engagement with each other, said clutch elements being responsive to the torque transmitted between said first clutch element and working cam face to effect axial disengagement between said clutch elements against the axial force exerted by said holding means; said working cam face having a shape in which the slope of the tangent at the point of contact of said face with said first clutch element changes as said first element is shifted relatively axially along said working cam face; and means for axially adjusting said first and second clutch elements with respect to each other to vary the initial point of contact between said first element and said working cam face through which the drive between said clutch elements is normally transmitted in order to vary the predetermined torque that must be transmitted between said clutch elements to effect automatic axial disengagement therebetween against the axial force of said holding means.

4. In releasable torque transmitting apparatus: driving and driven members; coengaging axially extending clutch elements on said members for transmitting torque therebetween, a first clutch element on one member engaging an axially extending working cam face of a second clutch element on the other member; means exerting a magnetic force tending to hold said clutch elements in engagement with each other, said clutch elements being responsive to the torque transmitted between said first clutch element and working cam face to effect axial disengagement between said clutch elements against the axial force exerted by said holding means; said working cam face having a shape in which the slope of the tangent at the point of contact of said face with said first clutch element changes as said first element is shifted relatively axially along said working cam face; and means for axially adjusting said first and second clutch elements with respect to each other to vary the initial point of contact between said first element and said working face through which the drive between said clutch elements is normally transmitted in order to vary the predetermined torque that must be transmitted between said clutch elements to effect automatic axial disengagement therebetween against the axial force of said holding means.

5. In releasable torque transmitting apparatus: driving and driven members; coengaging axially extending clutch elements on said members for transmitting torque therebetween, a first clutch element on one member engaging an axially extending working cam face of a second clutch element on the other member; means exerting an axial force tending to hold said clutch elements in engagement with each other, said clutch elements being responsive to the torque transmitted between said first clutch element and working cam face to effect axial disengagement between said clutch elements against the axial force exerted by said holding means; said working cam face being curved in a direction axially of said members such that the slope of the tangent at its point of contact with said first element changes as said first element is shifted axially with respect to said second element along said working cam face; and means for axially adjusting said first and second clutch elements with respect to each other to vary the initial point of contact between said first element and said working cam face through which the drive between said clutch elements is normally transmitted in order to vary the predetermined torque that must be transmitted between said clutch elements to effect automatic axial disengagement therebetween against the axial force of said holding means.

6. Releasable torque transmitting apparatus as defined in claim 5, wherein the curve of said working face satisfies the following equation:

$$Y = \frac{B}{A}(e^{AR\theta} - 1)$$

in which:

$Y$ = relative axial distance first and second elements have moved from a starting point;
$B$ = a constant, which is the slope of the tangent at the starting point of contact between the first and second elements;
$A$ = a constant, which determines rate of change of slope of the tangent as $Y$ increases;
$R$ = mean radius of working face of second element from axis of rotation of said other of said members; and
$\theta$ = relative angle of rotation, expressed in radians, of said other of said members about its axis.

7. In releasable torque transmitting apparatus: driving and driven members; coengaging axially extending clutch elements on said members for transmitting torque therebetween; said clutch element on said driving member engaging a working cam face of a clutch element on said driven member; means exerting an axial force on said driven member tending to hold said clutch elements coengaged, said clutch elements being responsive to the torque transmitted between said driving clutch element and working cam face to effect disengagement between said clutch elements against the force of said holding means; said working cam face having a shape in which the slope of the tangent at the point of contact of said face with said driving clutch element changes as said driven member and its clutch element are shifted axially with respect to said driving member; and means for adjusting said driven member axially of said driving member to axially shift said working cam face axially of said driving clutch element to vary the initial point of contact between said driving clutch element and said working cam face through which the drive between said clutch elements is normally transmitted in order to vary the predetermined torque that must be transmitted between said clutch elements to effect automatic axial shifting of said driven clutch element and driven member away from said driving member to obtain disengagement between said clutch elements against the axial force exerted by said holding means.

8. In releasable torque transmitting apparatus: driving and driven members; coengaging axially extending clutch elements on said members for transmitting torque therebetween; said clutch element on said driving member engaging an axially extending working cam face of a clutch element on said driven member; coacting means carried by said driving member and driven member to exert an axial force on said driven member tending to hold said driving and driven clutch elements coengaged; said clutch elements being responsive to the torque transmitted between said driving clutch element and working cam face to effect axial disengagement between said elements against the axial force of said coacting means; said working cam face having a shape in which the slope of the tangent at the point of contact of said face with said driving clutch element changes as said driving clutch element is shifted axially relatively along said working cam face; and means on said driven member for axially shifting said coacting means to vary the initial point of contact between said driving clutch element and said working cam face through which the drive between said clutch elements is normally transmitted in order to vary the predetermined torque that must be transmitted between said clutch elements to effect automatic axial shifting and disengagement between said clutch elements against the force of said coacting means.

9. In releasable torque transmitting apparatus: driving and driven members; coengaging axially extending clutch elements on said members for transmitting torque therebetween; said clutch element on said driving member engaging an axially extending working cam face of a clutch element on said driven member; a magnet carried by and rotatable with said driving member; an armature carried by and rotatable with said driven member and engageable with said magnet to exert an axial force on said driven member tending to hold said driving and driven clutch elements coengaged; said clutch elements being responsive to the torque transmitted between said driving clutch element and said working cam face to effect axial shifting of said driven clutch element and driven member against the force of said magnet exerted on said armature; said working cam face having a shape in which the slope of the tangent at the point of contact of said face with said driving clutch element changes as said driving clutch element is shifted axially relatively along said working cam face; means on said driving member for shifting said magnet coaxial of said driving member to shift said driven member and its clutch element axially of said driving member to vary the initial point of contact between said driving clutch element and said working cam face through which the drive between said elements is normally transmitted in order to vary the predetermined torque that must be transmitted between said clutch elements to effect automatic axial separation and disengagement therebetween against the force of said magnet on said armature.

10. In releasable torque transmitting apparatus: driving and driven members; coengaging axially extending clutch elements on said members for transmitting torque therebetween; said clutch element on said driving member engaging an axially extending working cam face of a clutch element on said driven member; a magnet threaded in said driving member; an armature carried by and rotatable with said driven member and engageable with said magnet to exert an axial force on said driven member tending to hold said driving and driven clutch elements coengaged; said clutch elements being responsive to the torque transmitted between said driving clutch element and said working cam face to effect axial shifting of said driven clutch element and driven member against the force of said magnet exerted on said armature; said working cam face having a shape in which the slope of the tangent at the point of contact of said face with said driving clutch element changes as said driving clutch element is shifted axially relatively along said working cam face; means on said driving member to rotate said magnet in said driving member and feed it axially of said driving member to shift said driven member and its clutch element axially of said driving member to vary the initial point of contact between said driving clutch element and said working cam face through which the drive between said elements is normally transmitted in order to vary the predetermined torque that must be transmitted between said clutch elements to effect automatic axial separation and disengagement therebetween against the force of said magnet on said armature.

11. In releasable torque transmitting apparatus: driving and driven members; coengaging clutch elements on said members for transmitting torque therebetween, said elements being disengageable from each other upon being subjected to a predetermined torque; means for holding said clutch elements in engagement with each other, including a magnet on and rotatable with one of said members and an armature on the other of said members acted upon by said magnet; and means for shifting said magnet axially of said one of said members to cause said magnet to shift said armature and other of said members axially of said one of said members to vary the initial point of engagement between said clutch elements and thereby vary the torque at which said elements disengage from each other.

12. In releasable torque transmitting apparatus: driving and driven members; coengaging clutch elements on said members for transmitting torque therebetween, said elements being disengageable from each other upon being subjected to a predetermined torque; means for holding said clutch elements in engagement with each other, including a magnet on said driving member and an armature on said driven member acted upon by said magnet; and means for shifting said magnet axially of said driving member to cause said magnet to shift said armature and driven member axially of said driving member to vary the initial point of engagement between said clutch elements and thereby vary the torque at which said elements disengage from each other.

13. In releasable torque transmitting apparatus: driving and driven members; coengaging clutch elements on said members for transmitting torque therebetween, said elements being disengageable from each other upon being subjected to a predetermined torque; means for holding said clutch elements in engagement with each other, including a magnet threaded in one of said members, an armature on the other of said members acted upon by said magnet; and means for rotating said magnet with respect to said one of said members to feed said magnet axially of said one of said members to cause said magnet to shift said armature and other of said members axially of said one of said members to vary the initail point of engagement between said clutch elements and thereby vary the torque at which said elements disengage from each other.

14. In releasable torque transmitting apparatus: driving and driven members; coengaging clutch elements on said members for transmitting torque therebetween, said elements being disengageable from each other upon being subjected to a predetermined torque; means for holding said clutch elements in engagement with each other, including a magnet threaded in said driving member, an armature on said driven member acted upon by said magnet; and means for rotating said magnet with respect to said driving member to feed said magnet axially of said driving member to cause said magnet to shift said armature and driven member axially of said driving member to vary the initial point of engagement between said clutch elements and thereby vary the torque at which said elements disengage from each other.

15. In releasable torque transmitting apparatus: driving and driven members; coengaging clutch elements on said members for transmitting torque therebetween, said elements being disengageable from each other upon being subjected to a predetermined torque; means for holding said clutch elements in engagement with each other, including a magnet threaded in one of said members, an armature on the other of said members acted upon by said magnet; and intermeshing gearing on said magnet and said one of said members for rotating said magnet and feeding it axially of said one of said members to cause said magnet to shift said armature and other of said members axially of said one of said members to vary the initial point of engagement between said clutch elements and thereby vary the torque at which said elements disengage from each other.

16. In releasable torque transmitting apparatus: driving and driven members axially movable with respect to each other; an axial cam on one of said members; an axial cam on the other of said members; an annular carrier; and a roller rotatably mounted in said carrier and extending inwardly from said carrier into engagement with both cams to effect a rotatable driving connection between said members and tending to effect relative axial movement between said members, said roller being disengaged from at least one of said cams in response to the torque transmitted therebetween, said roller being free from support at its inner end.

17. In releasable torque transmitting apparatus: driving and driven members coaxial of one another and axially movable with respect to each other; a cam on one of said members extending axially therebetween; a cam on the other of said members extending axially therefrom; an annular carrier coaxial of said members; and a roller rotatably mounted in said carrier and extending generally radially inwardly from said carrier into engagement with both cams to effect a rotatable driving connection between said members and tending to effect relative axial movement between said members, said roller being disengaged from at least one of said cams in response to the torque transmitted therebetween, said roller being free from support at its inner end.

18. In releasable torque transmitting apparatus: driving and driven members coaxial of one another; a cam on one of said members extending axially therefrom; a cam on the other of said members extending axially therefrom; an annular carrier coaxial of said members; a roller rotatably mounted in said carrier and extending generally radially inwardly from said carrier into engagement with both cams to effect a rotatable driving connection between said members and tending to effect relative axial movement between said members, said roller being disengaged from at least one of said cams in response to the torque transmitted therebetween; and a spring means urging said carrier and roller axially toward one of said members, said roller being free from support at its inner end.

19. In releasable torque transmitting apparatus: driving and driven members; an element on one of said members; an axial cam element on the other of said members; an annular carrier; and a roller rotatably mounted in said carrier and extending generally radially inwardly from said carrier into engagement with both elements to effect a rotatable driving connection between said members and tending to effect relative axial movement between said members, said roller being disengaged from said cam element in response to torque transmitted between said elements, said roller being free from support at its inner end.

20. In releasable torque transmitting apparatus: driving and driven members; coengaging clutch elements on said members for transmitting torque therebetween, said elements being disengageable from each other upon being subjected to a predetermined torque; means for holding said clutch elements in engagement with each other, including a magnet on and rotatable with one of said members and an armature on the other of said members acted upon by said magnet; and means for varying the initial point of engagement between said elements to vary the torque at which said elements disengage from each other, said varying means comprising instrumentalities for shifting said magnet axially of said one of said members.

21. In releasable torque transmitting apparatus: driving and driven members; coengaging clutch elements on said members for transmitting torque therebetween, said elements being disengageable from each other upon being subjected to a predetermined torque; means for holding said clutch elements in engagement with each other, including a magnet on said driving member and an armature on said driven member acted upon by said magnet; and means for varying the initial point of engagement between said elements to vary the torque at which said elements disengage from each other, said varying means comprising instrumentalities for shifting said magnet axially of said driving member.

22. In releasable torque transmitting apparatus: driving and driven members; coengaging clutch elements on said members for transmitting torque therebetween, said elements being disengageable from each other upon being subjected to a predetermined torque; means for holding said clutch elements in engagement with each other, including a magnet threaded in one of said members and an armature on the other of said members acted upon by said magnet; and means for varying the initial point of engagement between said elements to vary the torque at which said elements disengage from each other, said varying means comprising instrumentalities for rotating said magnet with respect to said one of said members to feed said magnet axially of said one of said members.

References Cited in the file of this patent

UNITED STATES PATENTS

| | | |
|---|---|---|
| 1,678,634 | Chandler | July 31, 1928 |
| 1,708,215 | Chryst | Apr. 9, 1929 |
| 2,050,910 | Zancan | Aug. 11, 1936 |
| 2,068,260 | Biggert | Jan. 19, 1937 |

FOREIGN PATENTS

| | | |
|---|---|---|
| 630,417 | Germany | May 27, 1936 |